United States Patent [19]
Link

[11] 4,453,473
[45] Jun. 12, 1984

[54] PLANT FOR SUPPLYING HEATING SYSTEMS WITH SOLID FLOWABLE FUEL

[75] Inventor: Otmar Link, Buchen-Götzingen, Fed. Rep. of Germany

[73] Assignee: Azo-Maschinenfabrik Adolf Zimmermann GmbH, Osterburken, Fed. Rep. of Germany

[21] Appl. No.: 461,983

[22] Filed: Jan. 28, 1983

[30] Foreign Application Priority Data

Feb. 13, 1982 [DE] Fed. Rep. of Germany ....... 3205146

[51] Int. Cl.³ .......................... F23K 3/02; F23G 7/00
[52] U.S. Cl. .................................. 110/106; 110/222; 110/263
[58] Field of Search ............... 110/106, 262, 263, 238, 110/222, 347

[56] References Cited

U.S. PATENT DOCUMENTS

| | | | |
|---|---|---|---|
| 2,213,668 | 9/1940 | Dundas et al. | 110/222 |
| 2,716,002 | 8/1955 | Craig | 110/106 |
| 4,182,245 | 1/1980 | Stewart et al. | 110/106 |
| 4,249,471 | 2/1981 | Gunnerman | 110/106 |
| 4,310,299 | 1/1982 | Binasik et al. | 110/106 |
| 4,343,246 | 8/1982 | Jukkola et al. | 110/106 |
| 4,349,331 | 9/1982 | Floter | 110/106 |

*Primary Examiner*—Henry C. Yuen
*Attorney, Agent, or Firm*—McCormick, Paulding & Huber

[57] ABSTRACT

An apparatus for supplying stationary small- to medium-sized heating plant with flowable solid fuel such as coal dust or coal breeze has a vacuum conveyor running from a fuel storage container of the apparatus to the heating plant for transporting the fuel from the container to the boiler. The blower of the conveyor has an aspiration port joined up with the container. The container has flexible walls of textile material and has an air blow-off line and a filter sheet for separating the coal dust from any coal dust-air mixture produced. This design makes it possible for the heating plant to be run automatically with the least leakage of dust and volatile substances out into the air.

5 Claims, 2 Drawing Figures

PLANT FOR SUPPLYING HEATING SYSTEMS WITH SOLID FLOWABLE FUEL

BACKGROUND OF THE INVENTION

The present invention is with respect to an apparatus for supplying small- to medium-sized stationary heating plant with solid but flowable fuels as for example coal dust or coal grains, having at least on fuel storage bin, a boiler and a pneumatic conveying unit placed therebetween.

Herein the wording "small- to medium-sized heating plant" is used in the sense of plant with a small to medium heat output as used in private houses, groups of flats, public buildings and the like, but not plant with a high output as for example the heating plant of a district heating system.

Up till the present time a plant of the sort in question has for the most part been run on liquid or gas fuel, this offering the useful effect of simple control being possible, while on the other hand plant run on solid fuels such as coal or the like has become less common, and inasfar as it is still in existence, it mostly has to be stoked by hand which makes much work, but automatic operation is hardly possible because of the solid nature of the fuel, of the long burning time etc. Of late attention has been given to the idea of running heating plant with a small to medium heat output on flowable solid fuels such as coal dust and coal grains, such fuels having in fact been used for firing district heating systems for some time.

A condition that has to be kept to in this respect is that the storing and processing of the fuel be able to take place more or or less completely automatically, the consumer in fact become used to this in the case of liquid and gas fuels. The technical design side of conveying systems for such a purpose has largely been taken care of, inasfar as the fuel used is flowable coal material such as coal in a breeze-like or dust form, and there are furthermore no troubles in connection with the technical side of transport systems when such fuels are selected, because they may be transported to the point of use in tanker vehicles, and then pumped from the vehicle pneumatically into the consumer's storage space.

The present invention has to do with the storing of fuel by the consumer. In this respect a condition to be kept to by such storing system, if it to be competitive, is that, more importantly, it have a low purchase price in the first place. Furthermore it has to be possible for the solid fuel to be stored like heating oil indoors. If this is to be possible, the containers for the fuel have to be so designed that they may be installed in buildings very simply. A further point is that the heating plant is to be able to be run more or less automatically.

GENERAL OUTLINE OF THE INVENTION

One purpose of the invention is that of taking care of these shortcomings.

In one form of the invention the conveying unit is an aspiration conveying unit having a blower whose aspiration side is joined up with the outlet of the storage container by way of a separator whereas the outlet or pressure side of the blower is joined up with the air pressure head or cushion of the said container, the container having a duct for blowing off air therefrom.

Using this teaching it is now possible for flowable fuel to be conveyed automatically to the heating plant. Because as a general point the fuel only has to be supplied at a low rate, a vacuum conveyor may be used, that has a lower wear rate than a system run under pressure because of the lower conveying speed, and furthermore less dust is formed. A further useful effect is that nearly all the conveying system is under vacuum so that there is no loss to the outside of volatile substances always present in coal or of fine dust, even if there are leaks. Furthermore for stopping any development of dust clouds or any loss of volatile substances whatsoever from that part of the apparatus that is under pressure, the vacuum conveying unit is joined up with the storage container so that all parts of the conveying unit is shut off from the inside of the building and any dust or gas, which may furthermore be given off in the storage container, may be let off through the single air blow-off pipe of the storage container, for example directly to a point outside the building. The storage container and if necessary the blower may be housed in separate storeroom that is shut off, as is done in the case of systems for storing liquid fuel. In such a case all the part of the apparatus that is under pressure for at least some of the time is in the storeroom.

It is of value if the outlet of the separator of the vacuum conveying unit is joined up with a connection space that may be shut off from the unit and which is joined up with the boiler of the heating plant by way of a conveyor.

The fuel aspirated in one conveying cycle into the separator is deposited in the separator and cleared from the connection space after and may be transported therefrom by a mechanical conveying unit, as for example a screw conveyor or the like, to the boiler of the heating plant. The rate is controlled by way of the conveying cycle of the vacuum conveying unit or by way of the conveying cycle of the mechanical input system, care being take in the last case always to see that there is enough material filled into the connection space. In place of this it is furthermore possible for the fuel, if it is fine enough to be pneumatically forced through a cell-type air lock feeder (whose cells are purged) into the burner of the boiler.

As for the part of the invention having to do with the storage container, the container may be in the form of a bin made of flexible, air tight material and supported in a frame with a sheet of material placed some distance under the top wall of the bin, the sheet being of such a nature that it lets through gas but keeps back dust, while the inlet line is run into the space under the sheet of material and the top of the bin has an opening for blowing off air therefrom.

Bins of flexible material as for example textile material with a coating to make it air tight have so far only been used for other purposes, as for example for storing foodstuffs such as flour in bakeries or the like. Furthermore such bins made of textile material have been fitted with a pneumatic conveying system. For solid fuels however, no suggestions have been made so far for the use of such bins, and furthermore in their normal form such materials would not have the right properties: solid flowable fuel, such as coal in the form of grains or dust always has volatile substances in it so that when the fuel shut in in a bin there is a greater danger of an explosion. It is for this reason that in the present invention the flexible-walled bin has an air let-off line or pipe that at the same time is used for ventilation of the coal so that the volatile substances collecting in the bin are diluted.

This being so, such a bin may furthermore not be filled with system normally so far used for this purpose, as for example with a compressed air conveying system because of the great amounts of dust produced. For this reason, in keeping with the invention, there is the sheet of material placed some distance under the top of the bin with the inlet line opening under it. The sheet of material, working as a sort of filter, lets through the volatile substances whereas the dust that has been pumped or produced is kept back by the sheet, it then settling so that it may be later supplied to the combustion system with rest of the coal in a breeze-like or dust form.

The flexible nature of the bin is furthermore put to a good use in the invention in another way as well: if the bin is filled using a pressure or vacuum system, its walls, and more more specially the sheet of material, will take on a form dependent on the pressure or vacuum building up in the bin. That is to say, there is a change in form. Because of this effect, more specially in the case of the sheet, grains of coal sticking to the inner faces of the bin will be cleared from therefrom so that there is no clogging or stopping up of the sheet. The same effect is produced every time an aspiration blower of the vacuum system in the building is run inasfar as the sheet is shaken every time the aspiration blower of the vacuum conveying unit in the building is turned on.

A last point is the very useful effect produced inasfar as the complete bin may be moved through narrow openings into a room where it may be put in place quite simply and without any complex operation of fitting different parts together. This being so, it is possible for such bins to be put up rooms so far used for storing heating oil, which normally have very narrow doorways or manholes.

In keeping with one more specially preferred part of the invention the inlet line or duct is run through the top of the bin generally in the middle of it, it then running through the sheet, that lets through gas, the top and sheet being fixed to the inlet line so that on the one hand when filling is taking place (because of the pressure difference between the coal space in the bin and the gas space over the sheet) the sheet will be evenly changed in form, this being the best way of cleaning it, while on the other hand the filling line will at the same time have the effect of a distance piece between the sheet and the top of the bin so that there will at this point be a defined space to take up the volatile substances.

A useful effect is produced as well if there is a dome of stiff material placed gas-tightly in the middle of the bin top with the inlet line, air blow-off line and a connection for the aspiration blower fixed to it.

This dome with the inlet line or a part thereof and the air let-off line may readily be fitted on putting up the bin in the room to be used for it, for example after making an opening in the top of the bin and joining the edge of the opening with the dome using a grommet.

Further details and useful effects of the invention will be seen from the account now to be given of one preferred working example of the invention.

LIST OF DIFFERENT VIEWS OF THE FIGURES

DETAILED ACCOUNT OF WORKING EXAMPLE OF THE INVENTION

Figure 1:
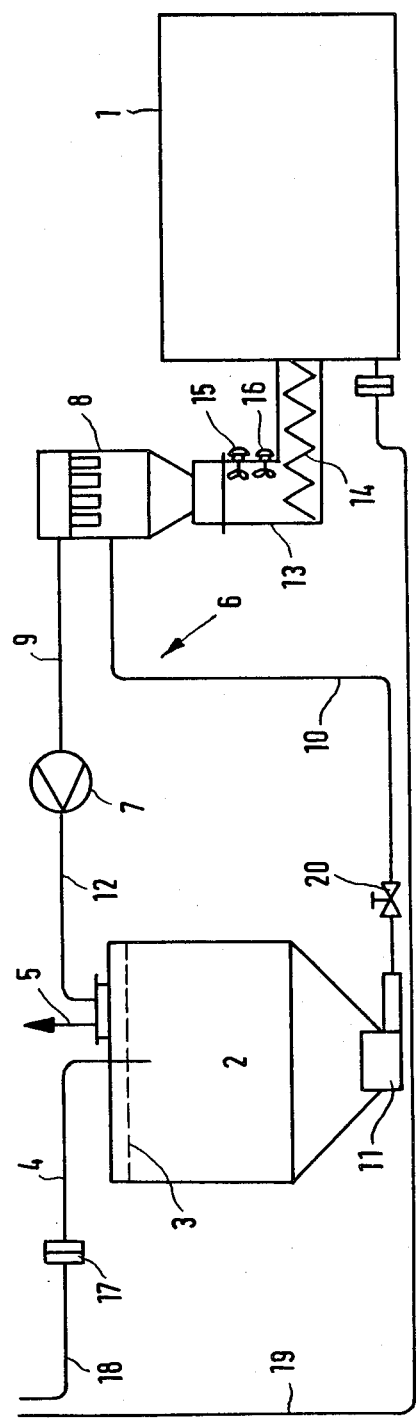
FIG. 1 is a flow chart of an apparatus in keeping with the invention

The apparatus of FIG. 1 is placed next to a heating plant that is marked in the form of block because its design is unimportant here. The plant will have a boiler with a burner or grate for burning the fuel and a space or container for the ash produced. There is furthermore a storage container 2 or having a filter 3 in its top part with the inlet line 4 opening into the container under the filter. The storage container 2 furthermore has an air blow-off line 5 and a vacuum conveying unit 6, whose main parts are a blower 7 and a separator 8. For its part the separator has a clean gas space and a product space, that are walled off from each other by a filter, filter elements or the line. The blower 7, whose direction of blowing is marked by the arrow head, has at its input an aspiration port side joined up by way of a line 9 with the clean gas port of the separator 8 whereas its product space is joined up by way of a vacuum line 10 with the outlet 11 of the storage container 2. There is a shut-off valve 20 in the vacuum line 10. On its pressure side a pressure port of the blower 7 is joined up by way of a line 12 with the storage container 2, this line 12 opening into the container at a higher level than the filter 3. A connection space or chamber 13 is joined up with the separator, such space having at its lower end a mechanical conveying part 14, as for example a conveyor screw, and furthermore it has a warning part 15 worked when the space 13 is full and a warning part 16 worked when it is empty, such parts controlling or switching off the vacuum conveying unit 6. The fuel is conveyed by the conveyor into the boiler of the heating plant.

The inlet line 4 of the storage container 2 has a connector 17 for joining up with a gage pressure conveying line 18, this line being for example part of a pressure conveying unit of a tanker vehicle. Lastly a vacuum duct or line 19, in the simplest case a delivery hose, may be joined up with the ash pan or box of the heating plant 1 for taking up and transport of the ash away from the building.

The fuel is transported to the consumer by a tanker vehicle or the like and when this is done the pressure line 18 is joined up through the connector 17 with the inlet line 4 of the storage container 2. The fuel then makes its way out of the tank of the tanker vehicle through the pressure line 18 and inlet line 4 into the storage container 2. Coal dust produced is kept back by the filter 3, whereas volatile substances are let off through the blow-off line 5. By opening the shut-off valve 20 and turning on the aspiration blower 7 the flowable fuel present at the outlet of the storage container is conveyed by the vacuum effect by way of the vacuum line 10 into the separator 8 where it is separated from the air that was used for transporting it. The clean air, which may still have fine dust or at least volatile substances, is forced by way of the pressure port of the blower 7 through the vacuum line 9 and the pressure line 12 into the storage container 2 over the filter 3, from which point the volatile substances may be let off through the air blow-off line 5.

The fuel coming into the separator 8 is let off therefrom by way of a valve, as for example one in the form of door, into the connection space 13 and from this space it is transported to the boiler by the conveyor screw 14. The turning on and off of the aspiration blower 7 and for this reason the rate of amount of conveyed fuel may be controlled by way of the warning parts 16 and 15 that are worked when the space 13 is empty and full. It is furthermore possible for the shut-off valve 20 in the vacuum line to be controlled, although it does have to be shut on filling the storage container 2.

Figure 2:
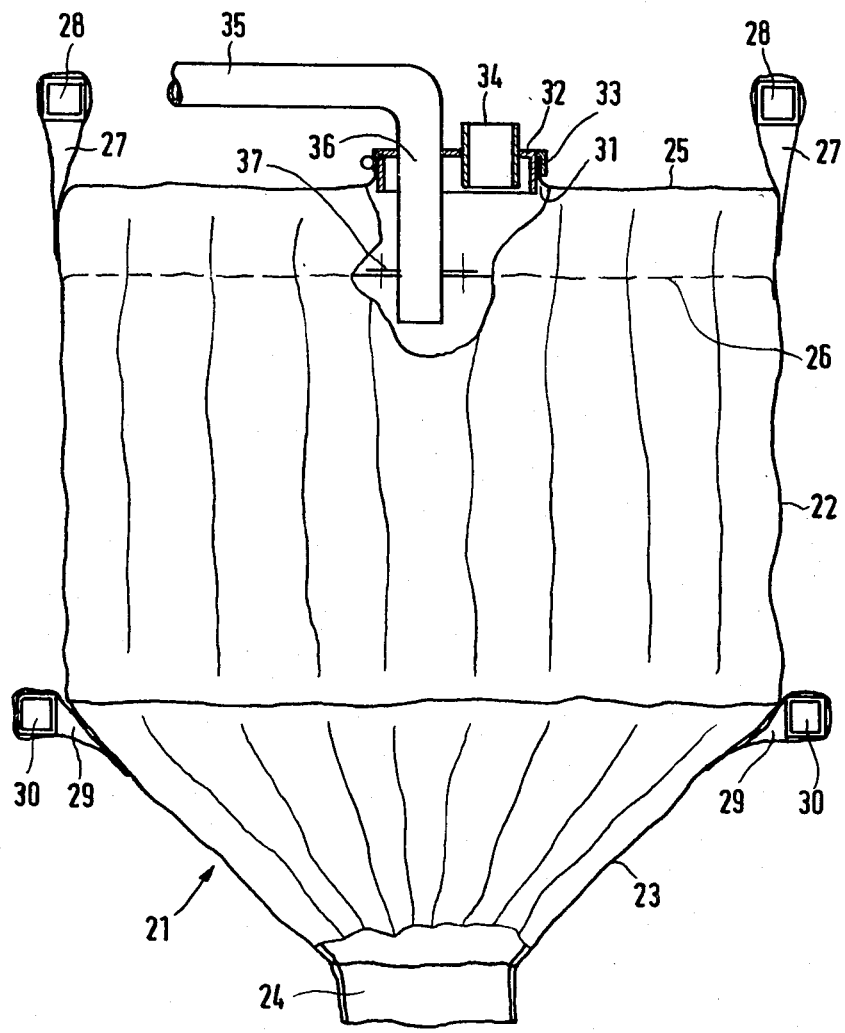
FIG. 2 is a view and part section of the storage container.

In FIG. 2 the reader will see a storage container in the form of a bin 21 in more detail. The bin 21 has a cylindrical part 22 and a downwardly narrowing, cone-like floor 23 having an outlet opening 24 and a top or top wall 25 shutting off the bin at its upper end. The bin is made of a flexible material, that does not let air through it, as for example a coated textile material, that has been stitched together into a pipe-like casing, the floor 23 thereof being made narrower in a downward direction by using pleats or hems. The top 25 is placed in this pipe-like casing. These parts of the bin 21 may be joined together by stitching, welding or the like. Under the top 25 and spaced therefrom there is a sheet 26 in the bin 21, it forming a sort of filter cloth and being stitched to the sides of the bin 21. This filter cloth is made of a very dense material that while letting through volatile gas-like substances, keeps back dust grains. Furthermore loops 27 are stitched to the outer face of the top part of the bin 21, the loops being for example of the same material as the bin 21 itself and are used for looping round the beams of a support frame 28, the bin hanging directly from the frame or being supported therein by a further frame. The are further loops 29 fixed at the join between the pipe-like part 22 and the narrowing floor 23 of the bin 21, these loops again being put round beams of a frame 30, that is used for keepin the bin pulled out tight at the join between the pipe-like part 22 and the floor 23 to make certain that the coal grains or dust may freely make its way down to the outlet opening 24.

The top 25 of the bin 21 has an opening 31 in the middle, in which a stiff dome 32 is fitted. The edge of this opening in the top 25 is air-tightly joined with the dome 32 using a grommet 33. The dome may be made of metal or synthetic resin, it being fitted with a pipe connector 34 for joining up with a pipe (not figured) for letting air into and out of the space between the gas-permeable sheet 26 and the top 25. There is furthermore an inlet line 35 running air-tightly through the dome 32, this line for example being part of a pneumatic conveying line run under pressure. The downwardly elbowed part 36 of the inlet line 35 is run through the sheet 26, it opening in the space of the bin 21 thereunder. The part 36 of the inlet line 35 is fixed to the sheet 26 by way of a flange-like plate 37. Although this is not to be seen in the figure, the pressure line 12 (see FIG. 1) of the aspiration blower 7 is run into the dome 32, such line opening at a higher level than the sheet 26. This pressure line may naturally enough be run into the space betwixt the top 25 and the sheet 26 at some other point, although it is best for it to be so positioned that the compressed air jet is directed on the sheet.

I claim:

1. An apparatus for supplying the boiler of a small to medium-sized heating plant with flowable solid fuel, comprising:
    at least one fuel storage container for holding a quantity of flowable solid fuel for delivery to the boiler and have an air blow-off line; vacuum conveying means extending between the storage container and the boiler and including an aspiration blower having an aspiration port and pressure port to provide motive air for moving the flowable solid fuel through the conveying means, and separator means having a clean gas outlet port and fuel outlet port for separating the fuel from the motive air, said aspiration port of the blower being connected to said clean gas outlet port of said separator, said pressure port of the blower being connected to an air pressure head of the container; a connection chamber connected between said fuel outlet port of said separator and the boiler for receiving the fuel separated from the air; means for closing off the connection chamber from the separator and conveyor means between the chamber and boiler for delivering the separated fuel to the boiler.

2. An apparatus claimed in claim 1 wherein said container is in the form of a bin made up of flexible air tight material forming top and side walls of said bin, said bin comprising a frame, said wall being supported by said frame, an inlet line and a sheet placed under said top wall, said sheet walling off a space between it and the top wall, said sheet being made of a material that is pervious to gas and impervious to dust, the inlet line opening into the bin under the said sheet, said top wall having an opening for the air blow-off line.

3. An apparatus as claimed in claim 2 wherein the inlet line is placed through the top wall generally at the middle thereof and through the gas-pervious sheet, and is fixed to the wall and sheet.

4. An apparatus as claimed in claim 2 further comprising a dome of stiff material gas-tightly fitted in an opening in the middle of the top wall of the bin, the inlet line and air blow-off line being fixed to the dome.

5. An apparatus as claimed in claim 4 comprising a grommet forming an air-tight joint between the dome and the top wall of the bin.

* * * * *